H. FRAPPART.
JOURNAL FOR CAR WHEELS FOR ALL KINDS OF VEHICLES.
APPLICATION FILED SEPT. 16, 1919.
1,348,400.
Patented Aug. 3, 1920.
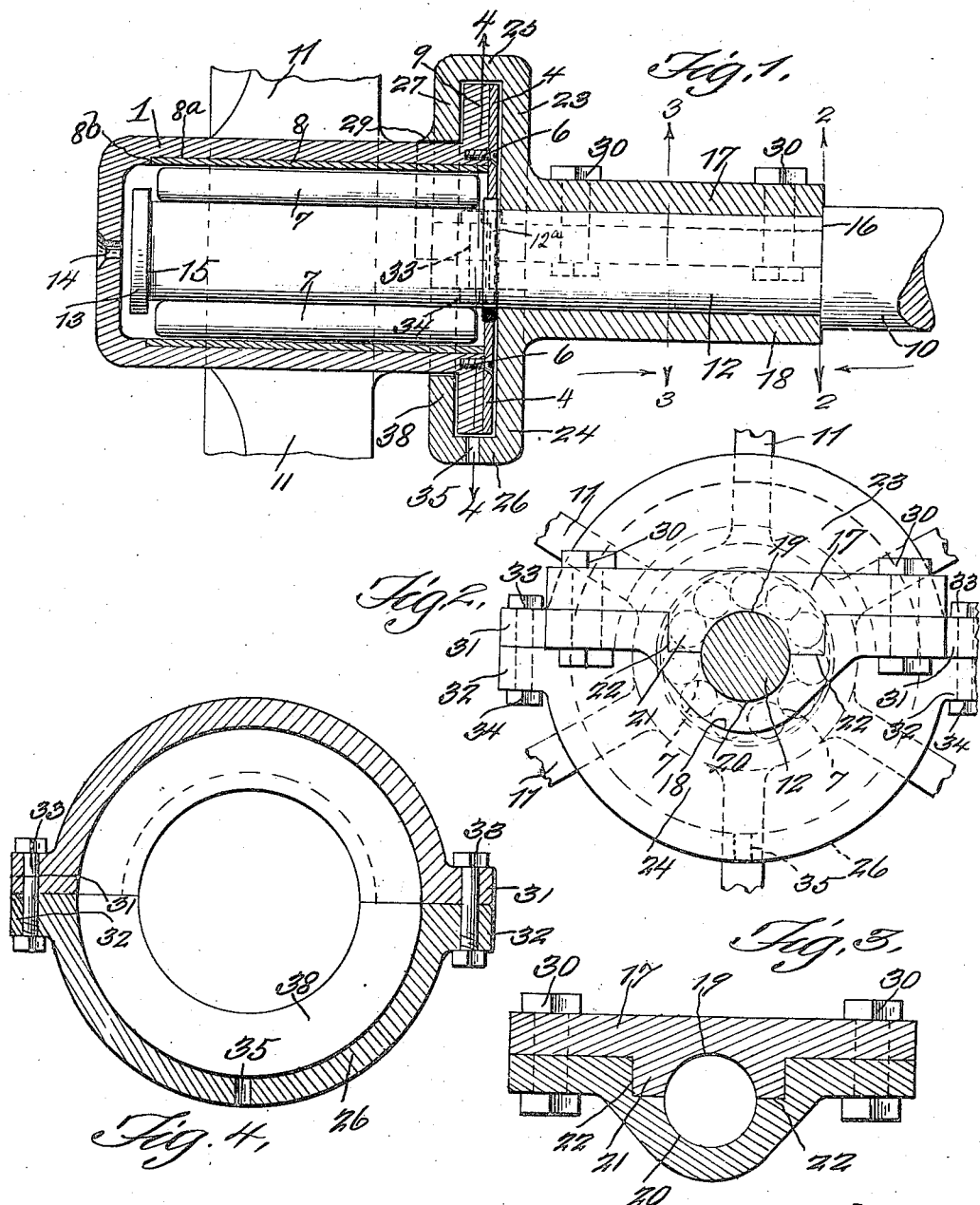

UNITED STATES PATENT OFFICE.

HENRY FRAPPART, OF KINCAID, ILLINOIS.

JOURNAL FOR CAR-WHEELS FOR ALL KINDS OF VEHICLES.

1,348,400.

Specification of Letters Patent.   Patented Aug. 3, 1920.

Application filed September 16, 1918. Serial No. 324,090.

*To all whom it may concern:*

Be it known that I, HENRY FRAPPART, a citizen of the United States, residing at Kincaid, in the county of Christian and State of Illinois, have invented certain new and useful Improvements in Journals for Car-Wheels for all Kinds of Vehicles, of which the following is a specification, reference being had to the accompanying drawings.

This invention relates to an improved journal for car wheels, and it has for its object to provide a simple, efficient and practical device of this kind, including anti-frictional means, to reduce the friction to a minimum.

A further object of the invention is to provide a journal and journal box including means for retaining the wheel in position.

A further object of the invention is to provide a device of this kind including a journal box, an axle mounted therein, on which the hub of the wheel is journaled, in combination with a chamber formed in the journal box, to receive an annular flange of the hub of the wheel, thereby retaining the wheel on the axle, there being means provided for retaining the anti-frictional means in position, between the axle and the interior of the hub of the wheel.

While the design and construction at present illustrated and set forth are deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a vertical sectional view through the improved journal and journal box constructed in accordance with the invention, showing the hub of the wheel and portions of its spokes connected thereto.

Fig. 2 is a sectional view on line 2—2 of Fig. 1, showing the journal box in elevation, and showing the anti-frictional rollers in dotted lines, coöperating between the hub of the wheel and the axle.

Fig. 3 is a cross-sectional view on line 3—3 of Fig. 1.

Fig. 4 is a sectional view on line 4—4 of Fig. 1, showing the retaining plate 4, the sleeve lining 8, anti-frictional rollers and axle removed.

Referring to the drawings, 1 designates the hub of a car wheel, which is hollow and cylindrical in form, and which has its inner end open and its outer end closed. However, the outer end of the hub is provided with an opening or aperture 14, through which suitable lubricant may be inserted for lubricating the hub and the anti-frictional rollers 7. The inner circumference of the hub 1 is counter-bored to provide an annular recess $8^a$, for the reception of a sleeve lining 8. This sleeve lining may be constructed of any suitable metal, preferably steel, though not necessarily, and it is to be noted that the lining is pressed into the hub of the wheel to prevent turning, and one end of the lining contacts with the shoulder $8^b$ of the interior of the hub. The usual form of spokes 11 project radially from the hub, as shown clearly in Figs. 1 and 2. The inner end of the hub terminates in an annular flange 9, and secured to the inner end of the hub are the semi-circular plates 4 and 5. These semi-circular plates are secured by means of screws 6. It is the aim that there should be a sufficient number of screws engaging the inner end of the hub to hold the semi-circular plates firmly in place. The plate 4 conforms concentrically with the annular flange 9 of the inner end of the hub. The plate 4 is of sufficient diameter near its central portion, to overlie the inner end of the sleeve lining, thereby affording means to prevent excessive movement of the anti-frictional rollers. In other words, the plate 4 constitutes retaining means for the anti-frictional rollers and the sleeve lining. An axle 10 is provided and it has a reduced portion 12. The outer end of the reduced portion 12 terminates in an integral annular collar 13, thereby forming a shoulder 15, against which the outer ends of the anti-frictional roller 7 may contact to not only prevent excessive movement of the rollers, but also to retain the wheel on the reduced end of the axle. Where the reduced portion 12 extends from the axle, a shoulder 16 is formed.

A journal box is mounted to engage the reduced portion 12 of the axle 10. This journal box comprises the top and bottom sections 17 and 18. These sections, as shown clearly in Figs. 1 and 2 are in the form of plates having semi-cylindrical bearings 19 and 20, which engage the reduced portion 12 of the axle. The upper plate section 17 and its under face is provided with an enlargement 21, which is elongated in form, and engages angular recesses 22 of the lower plate section, thereby reinforcing the two plate sections relatively to each other. The outer ends of the plate sections 17 and 18 are provided with annular flanges 23 and 24, which are provided with right angle portions 25 and 26, which overlie the marginal edges of the flange 9 and the retaining plate 4. These right angle portions or flanges 25 and 26 have extension flanges 27 and 28, which are disposed at right angles to the parts 25 and 26 and are arranged to engage the outer face of the annular flange 9 of the hub, thereby acting to retain the hub in place. The extension flange 27 is provided with a semi-circular lid 29, as shown clearly in Figs. 1 and 4, to overlie the hub of the wheel. The retaining plate 4 (which is in the form of a washer or circular plate) has its central opening large enough to receive an integral collar 12ª, which is formed on the reduced extension 12 of the axle 10. The opening in the retaining plate or washer 4 is made large enough to pass over the integral collar 13. The integral collar 12ª is formed upon the reduced extension 12 of the axle 10 in order to fill the opening in the washer or retaining plate. This retaining washer or plate is provided primarily to retain the lubricant in the hub of the wheel. The plate sections 17 and 18 of the journal box are secured together by means of the bolts 30. The parts of the journal box which overlie the annular flange 9 and the retaining plates 4 are provided with lateral extensions 31 and 32, through which bolts 33 pass, there being nuts 34 applied to the bolts, to additionally secure the parts of the journal box in place. It is to be noted that the inner ends of the plate sections 17 and 18 contact with the shoulder 16 of the axle 10. By virtue of the anti-frictional rollers 7 being positioned so as to engage the shoulder 15, and since the retaining plates 4 and 5 are positioned to abut the inner ends of the anti-frictional rollers, it is to be noted that the hub of the wheel and the journal box are held in position, and furthermore, excessive axial movement of the axle is prevented. The portion 26 of the lower plate section 18 has an outlet opening or orifice 35, adapted to carry off dirt or any foreign matter which may accumulate in the journal box. By virtue of the enlargement 21 engaging the angular recesses 22, the plate sections 17 and 18 are relatively reinforced thereby relieving the strain on the bolts 30, and also relieving the strain upon the bolts 33.

The invention having been set forth, what is claimed as new and useful is:

1. The combination with a journal boxing comprising separable parts, one end of said boxing terminating in a casing, of a wheel having a hub, one end of which rotatably fitting through one end of the wall of the casing, the end fitting through the wall having an annular flange swiveled in the casing, an axle provided with an elongated reduced end having a shoulder at its inner portion and a fixed collar substantially intermediate the shoulder and the outer end of the reduced portion, the portion of the reduced end between the collar and the shoulder journaled in the boxing, whereby as the flanged end of the hub of the wheel rotatably operates in the casing, the majority of the strain is relieved on the boxing by being transferred to the axle, a circular ring plate carried by the inner end of the hub and having a central opening overlying the periphery of the intermediate collar thereby providing a lubricant seal, the outer end of the reduced portion of the axle terminating in a fixed collar, the part of the reduced portion of the axle between the two collars being operatively mounted in the hub of the wheel.

2. In a device for the purpose indicated, an axle having a reduced axle and provided with a collar located centrally of said reduced axle end, a journal boxing in which a portion of the reduced axle end on one side of the central collar is mounted, a wheel having a hub rotatively and operatively connected with the journal boxing and mounted upon the reduced axle and on the other side of the central collar, a circular ring plate carried by the inner end of the hub and having a central opening in surrounding relation to the periphery of the central collar thereby constituting a lubricant seal.

3. In a device as set forth, an axle having a reduced axle and provided with a shoulder at its inner portion and a shoulder at its extreme outer end and having an intermediate collar, a journal boxing engaging the reduced axle and between the intermediate collar and the first shoulder, a wheel having a hub engaging between the collar at the extreme outer end of the reduced axle and the intermediate collar, said hub being rotatably and operatively connected to the journal boxing, a circular ring plate on the end of the hub which is operatively connected to the journal boxing, and provided with a central opening in surrounding relation with the periphery of the intermediate collar, thereby constituting a lubricant seal.

In testimony whereof I hereunto affix my signature.

HENRY FRAPPART.